(12) United States Patent  
Platner

(10) Patent No.: US 6,607,205 B2  
(45) Date of Patent: Aug. 19, 2003

(54) STEERABLE INDEPENDENT AIR SUSPENSION SYSTEM

(75) Inventor: David K. Platner, Shelby Township, MI (US)

(73) Assignee: Meritor Heavy Vehicle Systems L.L.C., Troy, MI (US)

(*) Notice: Subject to any disclaimer, the term of this patent is extended or adjusted under 35 U.S.C. 154(b) by 45 days.

(21) Appl. No.: 09/792,981

(22) Filed: Feb. 26, 2001

(65) Prior Publication Data

US 2002/0117829 A1 Aug. 29, 2002

(51) Int. Cl.$^7$ ................................................. B60G 9/02
(52) U.S. Cl. .......................... 280/124.116; 280/124.128; 280/124.106; 280/124.149
(58) Field of Search ................ 280/124.116, 124.13, 280/124.128, 124.157, 124.162, 124.107, 124.106, 124.149, 124.152, 124.166

(56) References Cited

U.S. PATENT DOCUMENTS

| | | | | |
|---|---|---|---|---|
| 3,589,700 A | * | 6/1971 | Ruet et al. | 267/221 |
| 3,601,426 A | * | 8/1971 | Hury | 267/221 |
| 3,964,764 A | | 6/1976 | Rickardsson | |
| 4,039,205 A | * | 8/1977 | Castanier | 280/124.109 |
| 4,261,591 A | * | 4/1981 | Warne, Jr. | 267/276 |
| 4,392,667 A | * | 7/1983 | Shakespear | 280/124.109 |
| 4,500,112 A | | 2/1985 | Raidel | |
| 4,655,467 A | * | 4/1987 | Kitzmiller et al. | 280/124.128 |
| 4,723,790 A | * | 2/1988 | Wharton | 267/279 |
| 5,118,131 A | * | 6/1992 | Manning | 280/124.109 |
| 5,409,254 A | * | 4/1995 | Minor et al. | 267/190 |
| 5,505,481 A | | 4/1996 | VanDenberg et al. | |
| 5,597,175 A | * | 1/1997 | Tuan | 280/124.111 |
| 5,678,845 A | | 10/1997 | Stuart | |
| 5,882,031 A | * | 3/1999 | VanDenberg | 280/124.116 |
| 5,951,032 A | | 9/1999 | Overby et al. | |
| 5,954,351 A | | 9/1999 | Koschinat | |
| 6,056,305 A | | 5/2000 | Pribyl | |
| 6,086,077 A | | 7/2000 | Stuart | |
| 6,123,352 A | | 9/2000 | Muzio | |
| 6,176,502 B1 | * | 1/2001 | Blondelet et al. | 280/124.128 |

FOREIGN PATENT DOCUMENTS

| | | | | | |
|---|---|---|---|---|---|
| JP | 406199237 A | * | 7/1994 | | 280/124.116 |
| JP | 410035238 A | * | 2/1998 | | 280/124.116 |
| JP | 411342715 A | * | 12/1999 | | 280/124.116 |
| JP | 200085616 | * | 3/2000 | | 280/124.116 |

OTHER PUBLICATIONS

Co–pending patent application Ser. No. 09/538,366 filed on Mar. 29, 2000 (specification and drawings).

Hendrickson International web page including a drawing of Hendrickson's suspension systems.

* cited by examiner

Primary Examiner—Toan C To
(74) Attorney, Agent, or Firm—Carlson, Gaskey & Olds

(57) ABSTRACT

An independent steerable air suspension system includes a torsional member to interconnect independent longitudinally extending suspension arms. The torsional member ties together the suspension arms to minimize side loads upon an air spring to increase vehicle roll stiffness. Bending moment due to the wheel load offset, braking, and other side-skid loads are transmitted through the suspension arms and the torsional member. In another embodiment, the suspension system includes an additional lateral support member which provides a rigid square-shaped suspension system which further increases rigidity.

25 Claims, 4 Drawing Sheets

STEERABLE INDEPENDENT AIR SUSPENSION SYSTEM

BACKGROUND OF THE INVENTION

The present invention relates to a vehicle suspension, and more particularly to a steerable independent suspension system which includes at least one cross member to reduce side loads, and increase roll stiffness.

The use of leaf spring suspension systems for cushioning a front steering axle is well known in the art. The use of air suspension systems in connection with the rear axles of vehicles is also well known. Attempts to adapt such air suspension systems to a front steering axle have been difficult because of concerns regarding bending loads and vehicle roll stability.

Vehicle suspensions are subjected to heavy bending loads through impacts and vibrations caused by bumps in the roadway, wheel offset, braking and other such loads. Bending loads and roll stability are of particular concern for vehicles which carry a load having a high center of gravity.

Air spring suspension systems include bellows-shaped air spring elements which are adjustable to compensate for various vehicle load conditions. However, air springs are rather unstable in certain vehicle roll restraining respects. Rigid axle housings have been used for torsional stability, but are necessarily inapplicable to an independent suspension system. Other mechanical torsional restrictors are also inapplicable because of the limited space allocated in the vehicle front end where many rather large vehicle components such as the engine and radiator are typically located.

Accordingly, it is desirable to provide an independent steerable air suspension system for a vehicle which provides enhanced roll stability while not interfering with components located in the vehicle forward section.

SUMMARY OF THE INVENTION

The independent steerable air suspension system according to the present invention generally includes a torsional member to interconnect independent longitudinally extending suspension arms. The torsional member ties together the suspension arms and provides torsional resistance therebetween. Bending moment due to the wheel load offset and other braking and side loads are transmitted through the hanger brackets and the torsional member. Roll stiffness is thereby increased and vehicle handling is improved.

In another embodiment, a lateral support member is located adjacent the air springs. By locating the lateral support member adjacent the air springs, a substantially rigid U-shaped system is constructed which resists bending loads and provides enhanced roll stability.

In another embodiment, the suspension system includes both a torsional member and a lateral support member to provide a rigid square-shaped suspension system to resist bending loads and provide still further roll stability.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
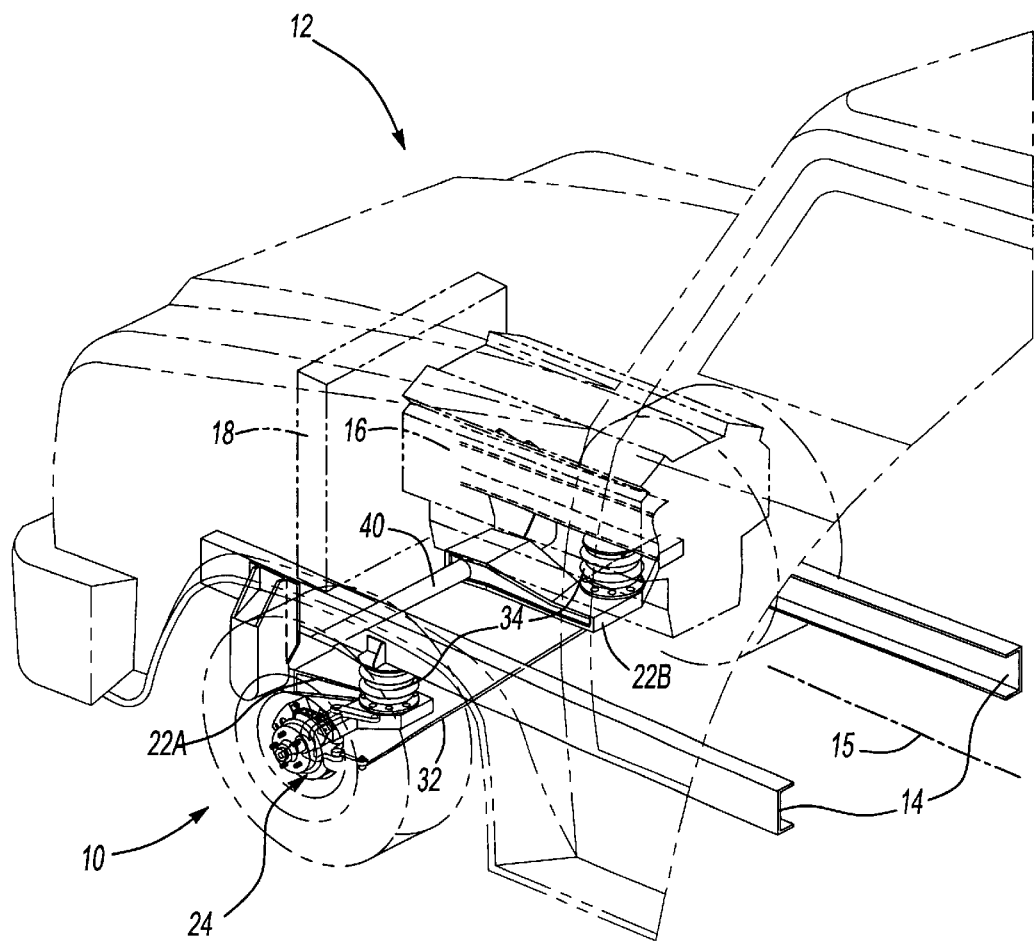
FIG. 1 is a general perspective view of a vehicle having an independent suspension system designed according to the instant invention.

FIG. 1 illustrates a steerable independent suspension system 10 for a vehicle. For brevity, references made herein to a vehicle should be considered to include trucks, semi-tractors, and other heavy vehicles and it should be understood that the invention disclosed herein may be further applied in a wide range of vehicles. The vehicle 12 includes a vehicle frame 14 that provides the primary structural support therefor. While the frame 14 preferably includes C-shaped beams, other shapes will benefit from the present invention. The frame 14 defines a longitudinal axis 15 that extends along the longitudinal length of the vehicle 12. An engine (illustrated schematically at 16) and radiator system (illustrated schematically at 18) are attached to the frame 14 adjacent the forward section thereof.

Figure 2:
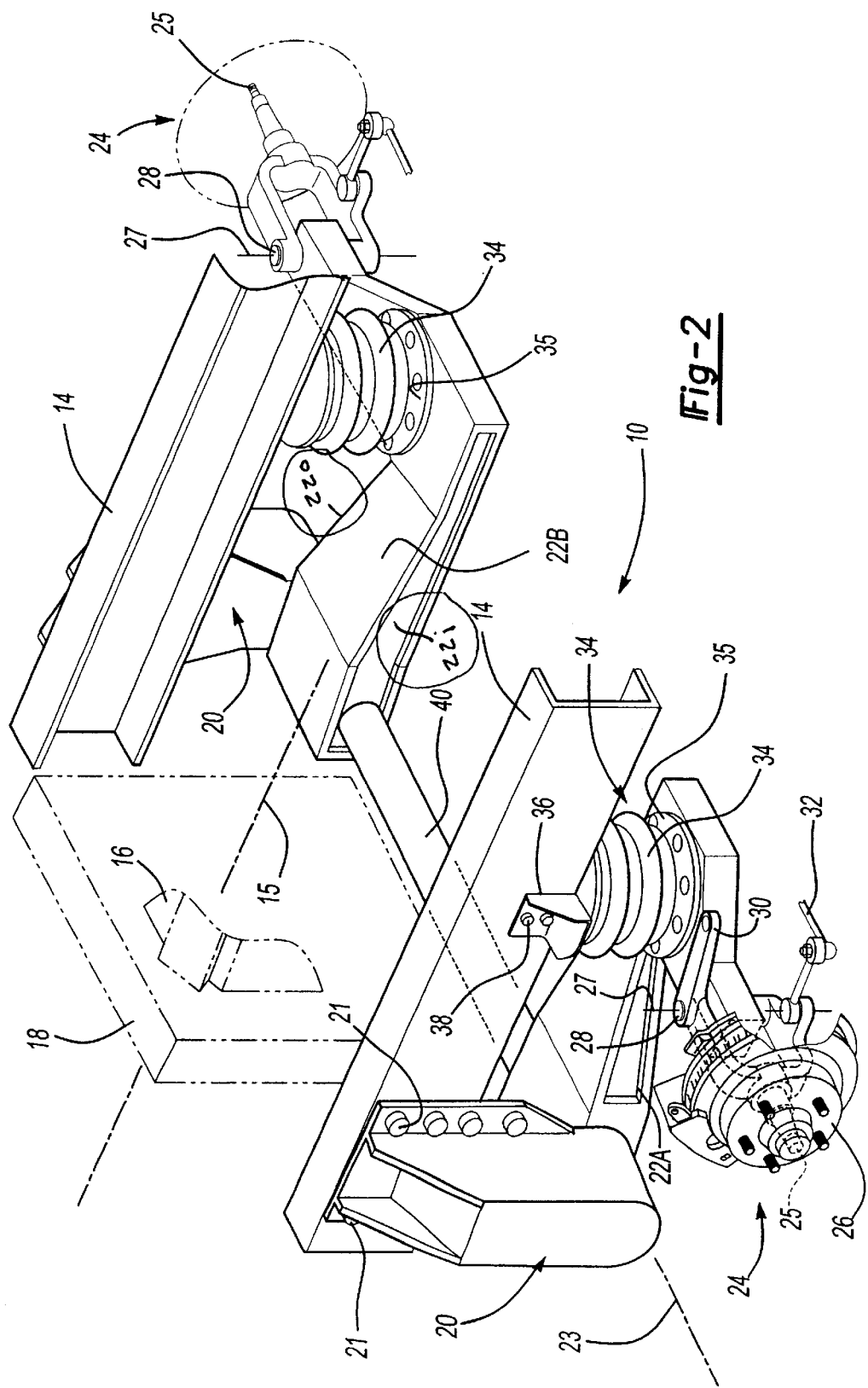
FIG. 2 is an exploded view of a vehicle suspension.

Referring to FIG. 2, the suspension system 10 is attached to the frame 14 by hanger brackets 20. The hanger brackets 20 are attached to the frame 14 by fasteners 21 such as bolts, welding, or the like. A first suspension arm 22A and a second suspension arm 22B are preferably constructed as box-beams, each of which pivotally extend from its respective mount 20. The suspension arms 22A, 22B pivot about a pivot axis 23 generally transverse to the frame 14 such that the suspension arms 22A, 22B are independently pivotal relative to the frame 14.

A steerable hub assembly 24 extends from each suspension arm 22A, 22B. The steerable hub assembly 24 includes a steerable hub 26 that is rotatable about a hub axle 25. The steerable hub assembly 24 is pivotable about a turning axis 27 defined by a hub king pin 28 or the like. A steering input linkage 30 extends from at least one of the steerable hub assemblies 24 to provide steering input. A linkage such as a tie-rod 32 links each steerable hub assembly 24 to provide coordinated steering of each steerable hub assembly 24. It should be realized that the suspension arms 22 are preferably trailing arms, however, other applications for Ackerman and steering control will also benefit from the instant invention.

An air spring 34 is preferably mounted between each suspension arm 22A, 22B and the frame 14. The air springs 34 provides vertical load support and are preferably adjustable based at least in part upon vehicle load conditions in a known manner. It is to be understood that the term air spring as used herein is not intended to be construed narrowly and should be taken to include bellows, air bags, and so forth. Also, suspension using pneumatic, hydraulic and coil springs also benefit from this invention and fall within its scope. The air springs 34 are secured to the suspension arms 22A, 22B by mounts 35 and to the frame 14 by an air spring brackets 36 which are attached thereto be fasteners 38 such as bolts, welding or the like. The air springs 34 carry the vertical load applied to the suspension system 10. The air springs 34, however, provide minimal bending load and torsional resistance.

A torsional member 40 is attached between the suspension arms 22A,22B to resist loads other than purely vertical loads. The torsional member is preferably located forward of the engine 16 and below the radiator system 18. In the FIG. 2 embodiment, the torsional member 40 is mounted along the pivot axis 23. The torsional member 40 ties together the suspension arms 22 and provides torsional anti-roll resistance therebetween. That is, the torsion member 40 is mounted to an inner side 22i of the suspension arms 22A, 22B and the outer side 22o of the suspension arms 22A, 22B are mounted to the hanger brackets 20. Bending loads due to vertical wheel load offset, braking and other side-skid loads are transmitted from the suspension arms 22A, 22B through the torsional member 40 and into the hanger brackets 20. As the torsional member 40 and suspension arms 22A 22B, must transfer and absorb both bending and roll loads, the suspension arms 22A, 22B are preferably constructed as a rather rigid goose-neck box-beam assembly to increase roll stiffness and improve vehicle handling. Roll stiffness is primarily determined by the appropriate sizing of the suspension arms 22A, 228 and the torsional member 40. It should be realized that the torsional member 40 in the disclosed embodiment is tubular in cross-section, but other configurations are also applicable.

Figure 3:
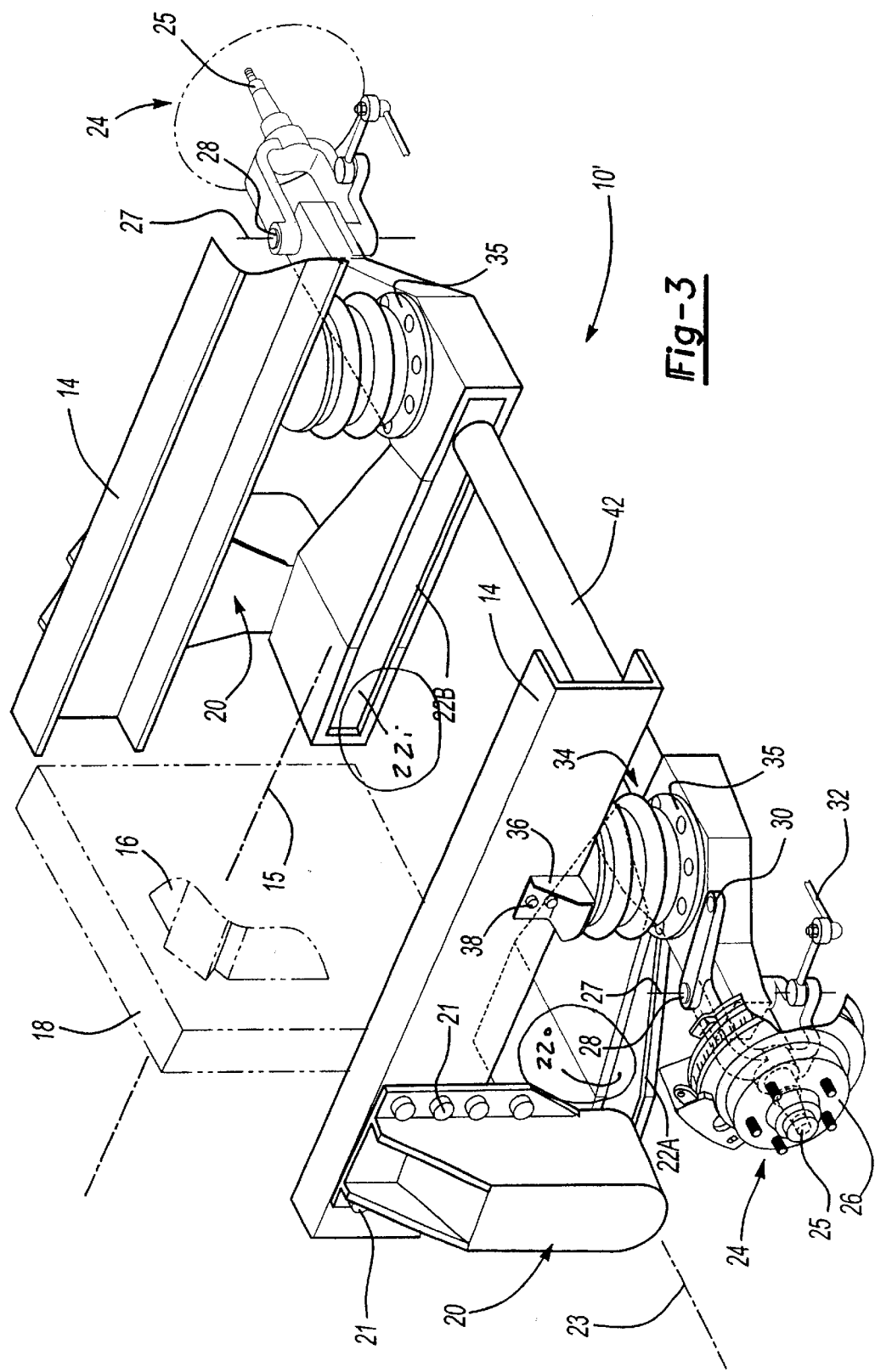
FIG. 3 is an exploded view of another vehicle suspension.

Referring to FIG. 3, another embodiment of the suspension system 10' is illustrated. Equivalent drawing numerals referring to equivalent structure is maintained. Air suspension system 10', locates a lateral support member 42 adjacent the air springs 34. By locating the lateral support member 42 adjacent the air spring 34, a substantially rigid U-shaped system is constructed which provides increased rigidity. As the lateral support member 42 is located adjacent to the air springs 34, the lateral support member 42 resists bending loads due to vertical wheel load offset. As the bending movement is primarily resisted by the lateral support member 42, the suspension arms 22A,22B are preferably constructed as a standard forged beam. Other braking and side-skid loads are transmitted through the suspension arms 22A, 22B and hanger brackets 20.

Figure 4:
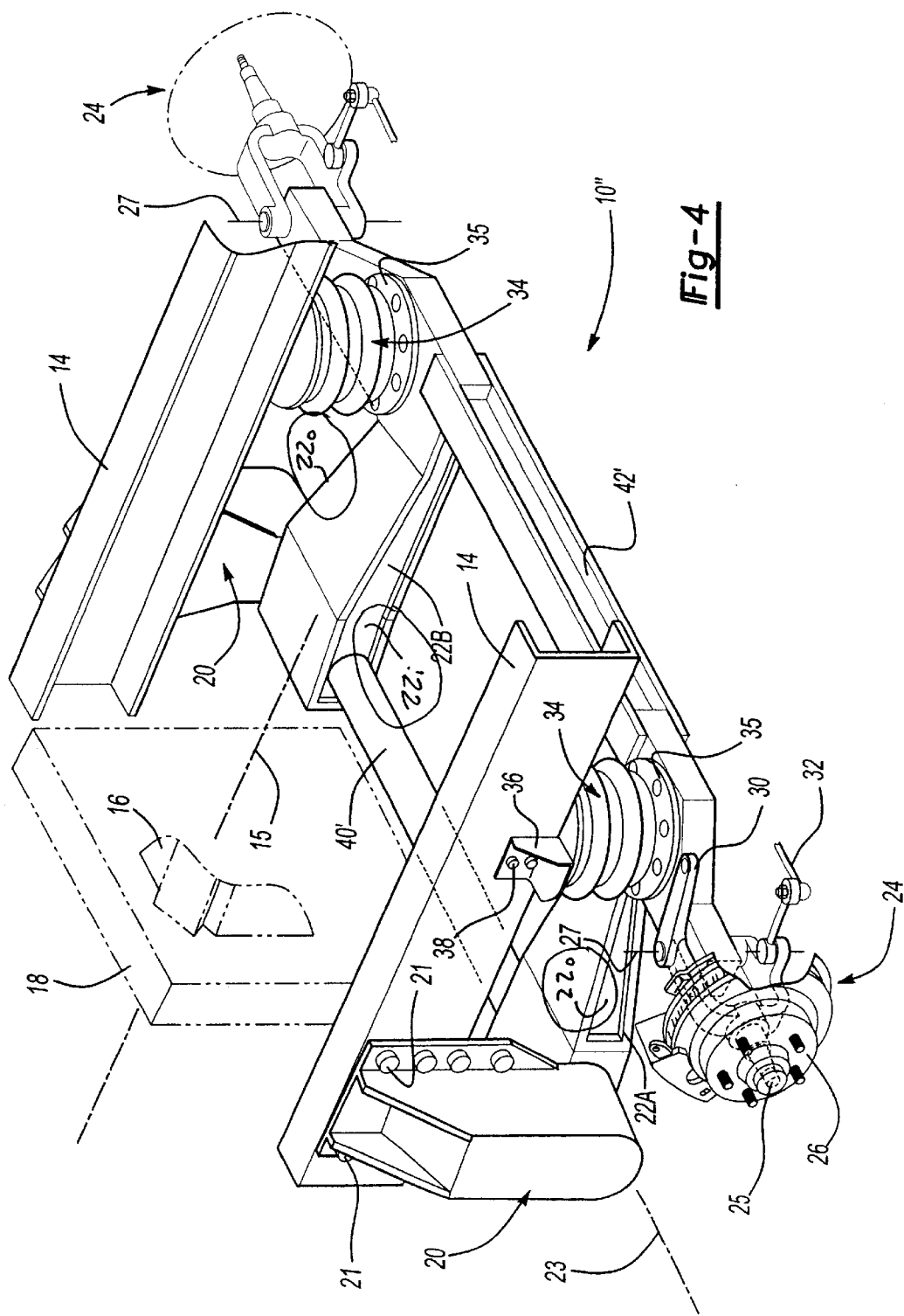
FIG. 4 is an exploded view of yet another vehicle suspension.

Referring to FIG. 4, another embodiment of the suspension system 10" is illustrated. Equivalent drawing numerals referring to equivalent structure are maintained. Suspension system 10", includes a lateral support member 42' and a torsional member 40'. The lateral support member in the disclosed embodiment is preferably an I-beam, however, other configurations will also benefit from the instant invention. By providing the torsional member 40' and the lateral support member 42', a rigid square-shaped suspension system provides further increased rigidity and roll stiffness. Bending loads due to vertical wheel offset and other braking and side-skid loads are split between the torsional member 40' and lateral support member 42' depending upon their relative stiffness. Roll stiffness is determined by the sizing of the torsional member as described herein above.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A steerable independent suspension system for a vehicle comprising:

a first and second suspension arm extending generally lengthways of a vehicle frame, said first and second arm independently pivotal relative to said vehicle frame about a pivot axis generally transverse to the vehicle frame;

a torsional member attached to said first and second arm generally transverse of the vehicle frame;

a steerable hub assembly attached to each of said first and second suspension arms; and an air spring attached between each of said first and second suspension arms and the vehicle frame.

2. The suspension as recited in claim 1, wherein said torsional member is a torque tube.

3. The suspension as recited in claim 1, wherein said first and second suspension arms include a goose-neck box beam assembly.

4. The suspension as recited in claim 1, wherein said torsional member is attached to said first and second arm along said pivot axis.

5. The suspension as recited in claim 4, further comprising a lateral support attached between said first and second arm.

6. The suspension as recited in claim 1, wherein said suspension arm is a trailing arm.

7. The suspension as recited in claim 1, furthering including a lateral support attached between said first and second arm such that a substantially square-shaped suspension system is formed.

8. The suspension as recited in claim 1, wherein said torsional member is fixed to said first and second trailing arm to resist torque.

9. The suspension as recited in claim 1, wherein an outre side of said first and second trailing arm is pivotally mounted to a hanger bracket which extends from said vehicle framed and torsional member is fixed to an inner side of said first and second trailing arm to resist torque.

10. The suspension as recited in claim 1, wherein said vehicle frame comprises first and a second C-beam.

11. A steerable independent suspension system for a vehicle comprising:

a first and second suspension arm extending generally lengthways of a vehicle frame, said first and second arm independently pivotal relative to said vehicle frame about a pivot axis generally transverse of the vehicle frame;

a torsional member attached to said first and second arm generally transverse of the vehicle frame along said pivot axis;

a steerable hub assembly attached to each of said first and second suspension arms; and an air spring attached between each of said first and second suspension arms and the vehicle frame.

12. The suspension as recited in claim 11, wherein said torsional member is a torque tube.

13. The suspension as recited in claim 11, wherein said first and second suspension arms include a forged beam.

14. The suspension as recited in claim 9, further comprising a lateral support attached adjacent said air spring.

15. The suspension as recited in claim 14, wherein said lateral support, said torsional member, and said first and second suspension arms form a substantially square-shaped suspension system.

16. The suspension as recited in claim 11, wherein said torsional member is fixed to said first and second trailing arm to resist torque.

17. The suspension as recited in claim 11, wherein an outer side of said first and second trailing arm is pivotally mounted to a hanger bracket which extends from said vehicle framed and torsional member is fixed to an inner side of said first and second trailing arm to resist torque.

18. The suspension as recited in claim 11, wherein said vehicle frame comprises a fir and a second C-beam.

19. A steerable independent suspension system for a vehicle comprising:
- a first and second trailing arm extending generally lengthways of a vehicle frame, said first and second trailing arm independently pivotal relative to said vehicle frame about a pivot axis generally transverse of the vehicle frame;
- a torsional member attached to said first and second trailing arm generally transverse of the vehicle frame;
- a steerable hub attached to each of said first and second trailing arms; and
- an air spring attached between each of said first and second suspension arms and the vehicle frame.

20. The suspension as recited in claim 19, further comprising a lateral support attached between said first and second trailing arm adjacent said air springs.

21. The suspension as recited in claim 19, wherein said torsional member is attached between said first and second trailing arms adjacent said air spring.

22. The suspension as recited in claim 19, wherein said torsional member is attached along said pivot axis.

23. The suspension as recited in claim 19, wherein said torsional member is fixed to said first and second trailing arm to resist torque.

24. The suspension as recited in claim 19, wherein an outre side of said first and second trailing arm is pivotally mounted to a hanger bracket which extends from said vehicle framed and torsional member is fixed to an inner side of said first and second trailing arm to resist torque.

25. The suspension as recited in claim 19, wherein said vehicle frame comprises a first and a second C-beam.

* * * * *

UNITED STATES PATENT AND TRADEMARK OFFICE
CERTIFICATE OF CORRECTION

PATENT NO.    : 6,607,205 B2
DATED         : August 19, 2003
INVENTOR(S)   : David K. Platner It is certified that error appears in the above-identified patent and that said Letters Patent is hereby corrected as shown below:

<u>Title page,</u>
Item [*] Notice, should read as follows -- Notice: Subject to any disclaimer, the term of this patent is extended of adjusted under 35 U.S.C. 154(b) by 103 days. --

<u>Column 4,</u>
Line 26, "outre" should be -- outer --

<u>Column 6,</u>
Line 10, "outre" should be -- outer --
Line 12, should read as follows, -- vehicle frame and said torsional member is fixed to an inner side --

Signed and Sealed this

Ninth Day of December, 2003

JAMES E. ROGAN
*Director of the United States Patent and Trademark Office*